Oct. 19, 1965     D. L. BARNEY     3,213,302

INSULATED METALLIC ARTICLES

Filed July 12, 1961

*INVENTOR.*
DUANE L. BARNEY

BY *James R. Campbell*

ATTORNEY

United States Patent Office 3,213,302
Patented Oct. 19, 1965

3,213,302
INSULATED METALLIC ARTICLES
Duane L. Barney, Schenectady, N.Y., assignor to General
Electric Company, a corporation of New York
Filed July 12, 1961, Ser. No. 123,494
2 Claims. (Cl. 310—45)

The invention described herein relates to insulated metallic bodies and particularly to insulated steel laminations used in magnetic cores of electric power equipment.

The silicon steel laminations comprising the magnetic cores of electrical apparatus, such as transformers, motors, generators, and the like, are each equipped with a layer of insulation on both sides to prevent establishment of magnetic short-circuits when the equipment subsequently is placed in operation.

Both inorganic and organic types of insulating materials are available for application in liquid form to the lamination surfaces during the manufacturing process prior to assembling them into a magnetic core. One inorganic type consisting essentially of a phosphorus compound, iron oxide, ammonia or ammonium, and fillers when applied to the surfaces and cured, furnishes a reasonably high quality insulation. However in some instances, the resistance values are not consistent for the same over-all thickness of insulation, even though a uniform coating appears on the surface. In those cases where such values are low, the affected laminations must be re-run through the insulation material process, thus adding considerably to the expense of manufacture.

An organic interlaminar insulation currently employed consists of a resinous composition carrier having a filler of silica. The resin has a decarbonizing temperature in the same range as that sometimes reached by the electrical equipment during operation. Since the laminated core is under pressure, the carbon formed from the resin is brittle and can be crunched by the pressure of the stack, thus reducing the space between laminations which existed prior to decarbonization. Nevertheless, the slight decarbonization which may take place does not permit establishment of magnetic short-circuits because the silica filler is unaffected, maintains the desired degree of spacing between adjacent laminations in the magnetic core stack. However, on rare occasions, the laminations migrate or work loose when the core pressure crunches the carbon between particles of silica and the lamination surface. The looseness thus established between adjacent laminations creates noise, especially when the machine is subjected to extremely hard usage over a period of years.

It is therefore apparent that the need exists for an interlaminar insulating material capable of overcoming the problems presented by currently available insulations, particularly one which will display high insulating qualities over a long period of time and not be subject to deterioration when exposed to the maximum operating temperature of magnetic cores.

The primary object of my invention therefore is to provide a low cost insulating material which can be applied easily to opposite sides of laminations for furnishing a thin layer of insulation displaying high mechanical and thermal characteristics.

In carrying out my invention, I apply a solution consisting essentially of glassy sodium phosphate, water and silica filler to the oxide coated surfaces of steel laminations or other metallic articles. The softening point of the sodium phosphate is considerably above the temperature expected to be encountered by electrical equipment during operation and the silica provides a spacing factor, in the case of laminated bodies, which minimizes smearing of metal from one lamination to the next when the assembled magnetic core surface is turned down in a lathe. The silica filler may be eliminated in those constructions where spacing between laminated articles is not necessary.

While the specification concludes with claims particularly pointing out and distinctly claiming the subject matter which I regard as my invention, it is believed the invention will be better understood from the following description taken in connection with the accompanying drawing in which:

The disclosure which follows is directed toward application of the inventive teachings to laminations comprising magnetic cores used in motors, generators, transformers, and the like. This is the preferred form of the invention but it will be understood that such teachings are equally applicable to metallic bodies other than those associated with the above kinds of apparatus.

Figure 1:
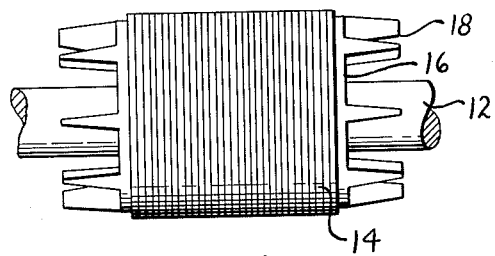
FIGURE 1 is a view in elevation of a conventional squirrel cage rotor having laminations treated in accordance with the present invention.
Figure 2:
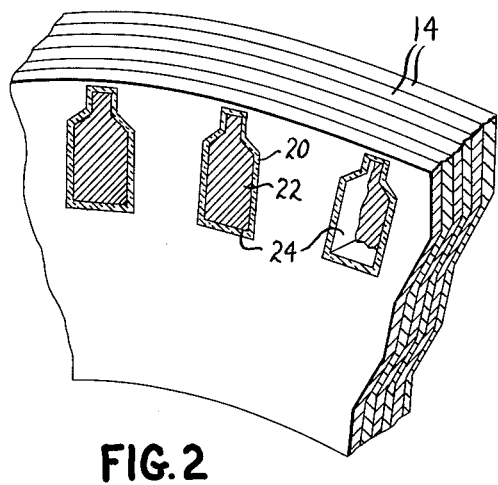
FIGURE 2 is a perspective view illustrating the use of such insulating material in the slots of a magnetic core of the type illustrated in FIGURE 1.

Referring now to the drawings wherein like reference characters designate like or corresponding parts throughout the several views, there is shown in FIGURE 1, a squirrel cage rotor having a shaft 12 supporting a plurality of laminations or punchings 14 having a cast winding therein which terminates in end rings 16 and fan blades 18 attached to opposite ends thereof. Each of the laminations 14 is coated on both sides with an insulation 24, described more fully hereafter, for preventing establishment of magnetic short circuits when they are assembled to form the magnetic core. As illustrated in FIGURE 2, the insulation 24 also may be applied to surfaces of the slot walls 20 which house conductors of any type, such as a cast aluminum winding 22.

Figure 3:
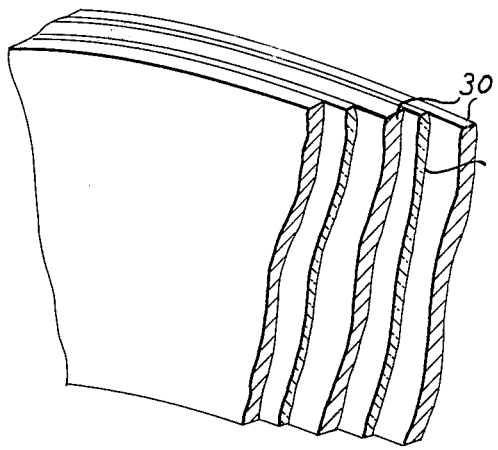
FIGURE 3 illustrates the application of the insulating layer to opposite sides of metallic articles.

FIGURE 3 illustrates in an enlarged view with the parts shown out of proportion, application of the insulation 24 to metallic articles 30 which selectively may be assembled in laminated form. As previously indicated, the interlaminar insulation 24 now used gives rise to problems associated with economy in manufacture and to performance of apparatus which includes laminations having such insulation.

The important attributes that the interlaminar insulating material must possess when applied to opposite sides of a lamination used in a magnetic core of a motor or generator are the following:

(a) The total build of insulation on each side thereof should be 0.5 mil or less. This value applies to a .014" lamination used in a machine designed for high quality performance.

(b) Conventional Franklin readings taken on each lamination heated to 150° C., where the probe pressure is 750 p.s.i., should produce the minimum requirements of current flow equal to 0.3 ampere on an average, when 0.5 volt is applied to the circuit which includes both the lamination and the tester. 0.5 ampere is the maximum allowable current flow.

(c) The insulation should be thermally stable up to 250° C.

(d) The rotor or stator core equipped with laminations having such insulation should be essentially incompressible after the manufacturing process is complete.

(e) The interlaminar insulating material should lend itself to easy application to opposite sides of a lamination such that the process is relatively trouble-free. Curing should occur at less than 475° C.

(f) The material costs should be competitive with currently available compositions now used for this purpose. Labor costs should be lower preferably than that now required for the application of present materials.

The composition I have chosen for fulfilling the above requirements is of an inorganic type and falls within the class of amorphous glassy sodium phosphates. A particular product in this class which has been found successful consists of approximately 25 grams glassy sodium metaphosphate, 100 grams water, and 5.6 grams silica.

The term glassy sodium phosphate is a generic term for a variety of materials which can be formed within the molar range from 1 $Na_2O/1$ $P_2O_5$ to 1.4 $Na_2O/1$ $P_2O_5$. These materials, sometimes called sodium hexametaphosphate, commercial sodium metaphosphate, and sometimes simply metaphosphate or sodium metaphosphate, are alkali metals, usually sodium phosphate polymers. A practically infinite number of those glassy phosphates can be made; however they are similar in their properties and any one of a number of commercial products could be used for this application.

The phosphate is obtained in powder form and mixed with the water and silica to form a solution having a viscosity which permits ready application to the lamination surfaces. The silica is employed for spacing adjacent laminations a distance sufficient to prevent smearing of steel from one lamination to the next when the assembled core is turned down in a lathe for obtaining a uniform diameter throughout its length. Different kinds of fillers may be used, such as oxides or silicates commercially available for this purpose.

With the solution prepared in the ratios described above, laminations to be coated are fed between a pair of rubber rollers and the solution poured or otherwise deposited on both sides thereof prior to entry into the rollers. The rollers provide a uniform coating on the surfaces and the laminations then are conveyed to an oven where the insulation is cured at 475° C. for approximately 2½ minutes. Variation in thickness of the insulating material on the lamination is obtained by varying the distance between the rollers.

When the insulation curing process is complete, the laminations are assembled into the form of a rotor, stator or transformer core by following conventional and well known factory processes.

To determine the effectiveness of laminations treated according to this invention, a solution was prepared consisting of 19.7% glassy sodium metaphosphate, 4.1% silica and 76.2% water and applied to opposite sides of laminations in the manner described above. The necessity for assuring that the laminations for a motor would be representative of those expected to be coated in production quantities, 11,000 stator laminations and 2500 rotor laminations, each having a thickness of .014" were selected for treatment. By applying statistical methods, 80 laminations were chosen from each group and the following readings were taken on the top and bottom sides of each lamination.

*Table I*

| Concentration | Stator | | Rotor | |
|---|---|---|---|---|
| | Top | Bottom | Top | Bottom |
| Average coating thickness per side (mils) | 0.145 | 0.163 | 0.183 | 0.175 |
| Number of thickness readings taken | 160 | 160 | 160 | 160 |
| Average Franklin amperes per side | 0.06 | 0.06 | 0.06 | 0.06 |
| Number of Franklin readings taken | 160 | 160 | 160 | 160 |

As previously indicated the build of insulation for acceptable performance preferably should be 0.5 mil per side or less. Measured values shown in the above table are 0.145 and 0.163, respectively, for the top and bottom of stator laminations and 0.183 and 0.175, respectively, for top and bottom sides of the rotor laminations.

These values illustrate the uniformity of coating on the laminations and as indicated hereafter, restricted current flow during the Franklin reading test to highly acceptable values.

The average current flow preferably should be 0.3 ampere or less in the circuit including the lamination and the Franklin tester. As shown in the table, average current flow per side was 0.06 ampere for each of the stator and rotor laminations tested. This is well below the average 0.3 value and indicates very high insulation resistance which is desirable.

Subsequent to the testing of such laminations, they were incorporated in rotor and stator magnetic cores, passed through the manufacturing cycle and the motor thereafter placed in service. Successful results have been achieved.

The attributes of glassy sodium phosphate which make it particularly desirable for use in motors and generators is its relatively high softening point which occurs at about 500° C., with ready flow taking place around 600° C. Although the insulating material can be cured at approximatly 475° C., the temperature at which softening will take place, is seldom, if ever, reached in a motor or generator for a time sufficient to be harmful.

The glassy sodium phosphate is known to react with metal oxides when molten, thus permitting development of a good bond to the lamination surface. This is significant since the factory process followed calls for annealing the laminations early in the manufacturing cycle so that an oxide coating is present when the insulating material is applied and cured on the lamination surface.

In addition to being soluble in water, which greatly facilitates applying the insulating material to the surfaces, it also compares favorably with costs for similar materials, in most cases, being less. The fact that glassy sodium metaphosphate is soluble in water required consideration of the moisture resistance of the cured coating. Experiments show this not to be a problem. A stream of water, 30 gal./hour at room temperature, was directed for one hour onto a coated lamination at a 45° angle. Franklin readings taken after this treatment were not significantly higher than readings made before treatment.

To determine the effectiveness of the insulation not having a silica filler, a solution of 50 grams sodium metaphosphate and 100 grams water was prepared and applied to lamination surfaces. The laminations chosen were of .014" thickness and annealed prior to application of the insulating material, followed by curing for five minutes at 470° C. The chart listed below illustrates the number of runs and laminations and the readings taken on both the top and bottom sides for determining the thickness of the cured insulation deposit.

The readings under Run No. 5 were treated the same as those in Run Nos. 1–4 except the insulation comprised 25 grams sodium phosphate, 5.6 grams silica aerogel and 100 grams water.

*Table II*

| Run No. | 1 | 2 | 3 | 4 | 5 |
|---|---|---|---|---|---|
| No. of laminations | 20 | 5 | 30 | 30 | 32 |
| Thickness: | | | | | |
| No. of thickness readings per side per lamination | 3 | 3 | 3 | 3 | 3 |
| (a) Top: | | | | | |
| Percent 0.1 mil or less | 97 | 100 | 100 | 72 | 0 |
| Percent 0.1 mil–0.2 | 3 | | | 28 | 9 |
| Percent 0.2 mil–0.3 | | | | | 43 |
| Percent 0.3 mil–0.4 | | | | | 48 |
| (b) Bottom: | | | | | |
| Percent 0.1 mil or less | | | 100 | 74.5 | 0 |
| Percent 0.1 mil–0.2 | | | | 21.0 | 8 |
| Percent 0.2 mil–0.3 | | | | 4.5 | 51 |
| Percent 0.3 mil–0.4 | | | | | 41 |

The above values illustrate the highly desirable characteristics of the insulating material when applied to a metallic surface. Its use however in a laminated core of the type employed in motors and generators is not especially suitable because of the lack of spacing factor which is necessary between adjacent laminations. The problem which arises is that when the rotor is turned in a lathe to provide a consistently uniform diameter throughout its length, the lack of space between adjacent laminations permits metal removed by the lathe to bridge over the next laminations, and thus establishes a short circuit between the laminations in the core.

Another important use of the insulation disclosed herein lies in its application to the slots of magnetic cores, particularly those of the type where the winding is cast in position, such as a squirrel cage induction motor rotor.

The temperature of molten aluminum used in casting the winding can vary between around 700° C. and 900° C. and since the glassy sodium phosphate, particularly sodium metaphosphate, melts at about 600° C., the temperatures are compatible. The heat of the aluminum during casting is sufficient to effect reaction between the sodium phosphate and the oxide coated walls of the conductor slots. The reaction product formed provides a dielectric barrier between the conductor and slot walls effectively serves to insulate the conductors from the iron of the core.

A solution of 50 grams per 100 grams of water applied to the slot walls by merely dipping the core in the solution provides an insulation having desirable dielectric characteristics. A composition of about one-half this strength is preferred since a precipitate of decomposition products forms less readily in the weaker solution.

Although the above disclosure has been made in relation to slots and to laminations which when assembled comprises the core of electrical power apparatus, it will be evident that the teachings of the invention are applicable equally to other products, particularly of a metallic nature which are required to withstand high dielectric stresses or be insulated from another object existing at a different electrical potential. Also, in view of the relatively high melting point of insulation disposed on the surface of the object, it will be evident that the invention will be useful with those products, not subjected to electric current but which must withstand high temperatures. It is intended that this invention will extend to such additional products.

In view of the above, it will be apparent that many modifications and variations are possible in light of the above teachings. It therefore is to be understood that within the scope of the appended claims the invention may be practiced other than as specifically described.

What I claim as new and desire to secure by Letters Patent of the United States is:

1. A magnetic core for use in electrical apparatus comprising a plurality of stacked laminations having conductor slots disposed therein, each of said laminations having a first insulation including a filler disposed on opposite sides thereof, and a second insulation disposed on the wall surfaces of said slots, said insulations comprising the reaction product formed in the presence of heat of glassy sodium phosphate and an oxide disposed on the surfaces of the metal, said insulations being cured to a hard glassy substance, and a winding including conductor bars bonded to the walls of said slots by said second insulation.

2. The combination according to claim 1 wherein the ratio percentage-wise of sodium phosphate to filler is in the neighborhood of 5 to 1.

References Cited by the Examiner

UNITED STATES PATENTS

| 1,850,726 | 3/32 | Pfalzgraff | 310—217 |
| 2,357,269 | 8/44 | Russell | 117—127 |
| 2,813,813 | 11/57 | Ley et al. | 148—6.15 |
| 2,930,723 | 3/60 | Drysdale et al. | 148—6.15 |
| 3,151,000 | 9/64 | Schmidt et al. | 148—6.15 |

ORIS L. RADER *Primary Examiner.*

DAVID X. SLINEY, MILTON O. HIRSHFIELD,
*Examiners.*